Feb. 5, 1963 L. G. DUBUIT 3,076,640
SURFACE TREATMENT OF CYLINDRICAL ARTICLES
Filed July 6, 1961 3 Sheets-Sheet 1

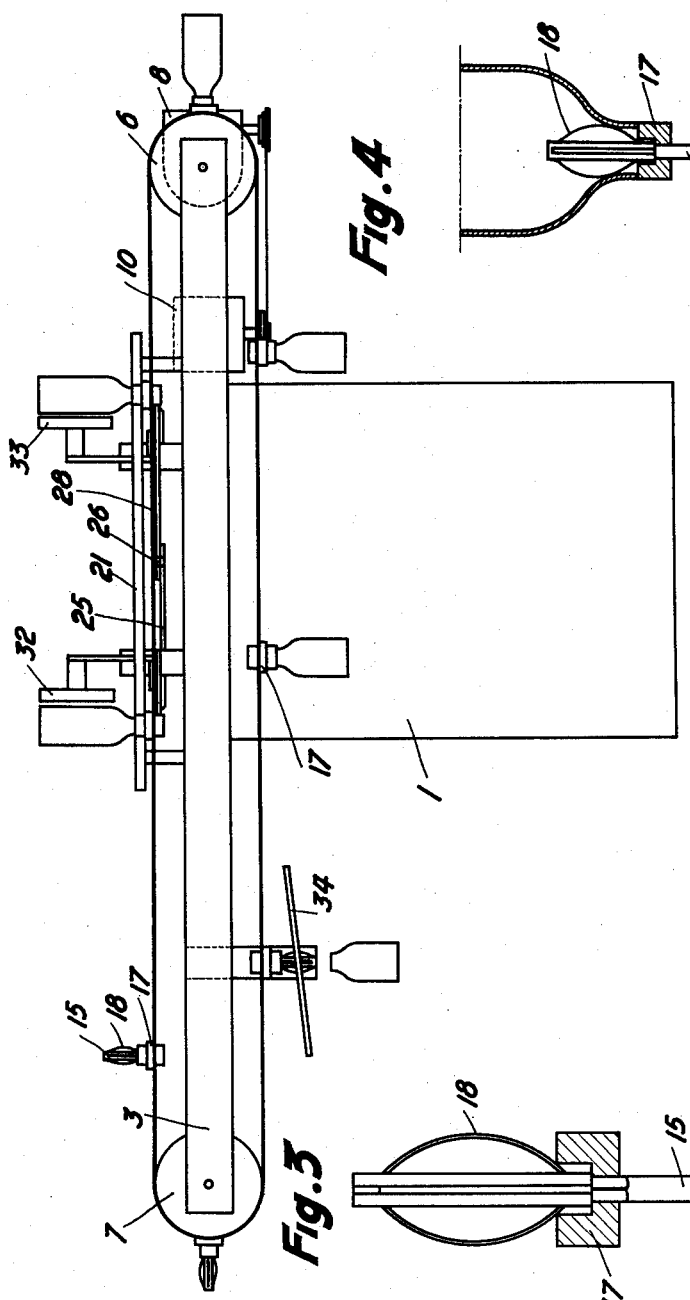
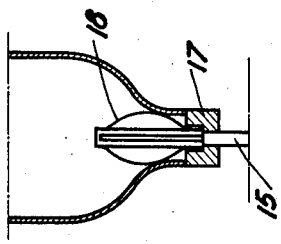
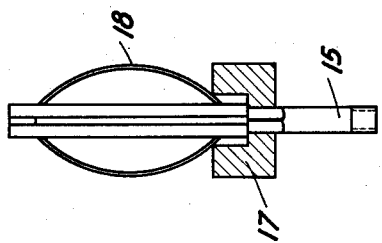

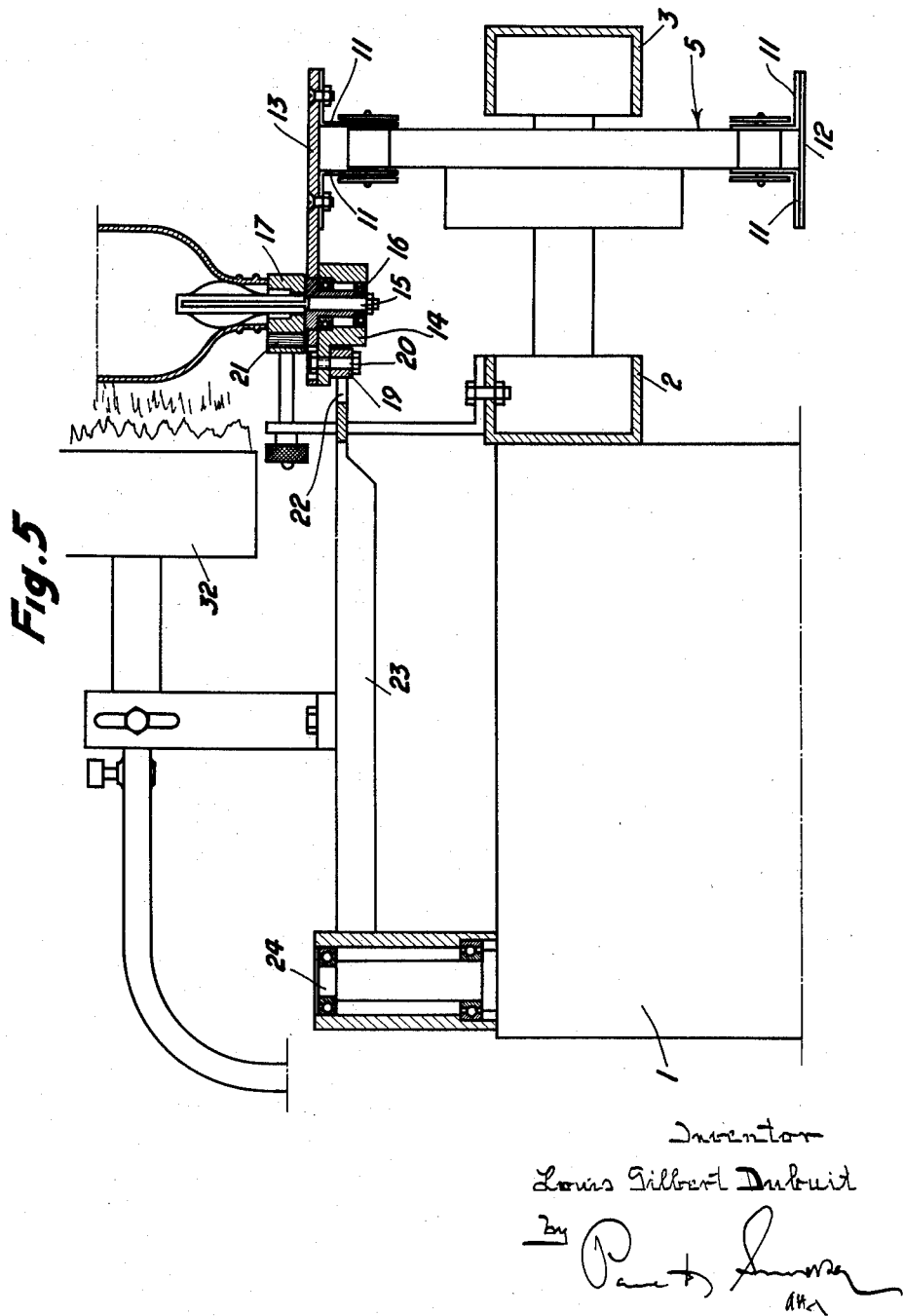

United States Patent Office 3,076,640
Patented Feb. 5, 1963

3,076,640
SURFACE TREATMENT OF CYLINDRICAL ARTICLES
Louis Gilbert Dubuit, 60 rue Vitruve, Paris, France
Filed July 6, 1961, Ser. No. 122,324
Claims priority, application France Oct. 14, 1960
4 Claims. (Cl. 263—6)

This invention relates to the surface treatment of generally cylindrical articles with said articles being rotated during the treatment, and it more especially relates to the flaming of the side surfaces of articles such as cylindrical containers made of polyethylene or the like, as is required prior to the printing of printed matter, patterns and the like upon said surfaces.

In the printing of the surfaces of articles made from certain substances such as polyethylene and other plastics, in such a manner that the printed matter will not be susceptible to erasure by wear, scraping and similar actions, it has been found necessary to pre-treat the surfaces by means of a high temperature oxidizing jet such as can be produced from a burner. Such treatment apparently modifies the crystalline and molecular structure in the surface of the material in such a manner that the subsequent print thereon will be stable and durable. In the case of articles of flat or oblong, i.e. dissymetrical shape, such pre-treatment is usually carried out by feeding the articles on a conveyor past one or more burners. In the case of articles having generally cylindrical surfaces, including conical surfaces or other shapes having rotational symmetry, it is necessary to rotate the surfaces continuously during exposure to the jet or flame from the burner in order to obtain a uniform treatment all around the surface. For this purpose it has been customary to mount such generally cylindrical articles upon rotatable bases of appropriate form and rotating them by some means, manually or otherwise, as they are exposed to the treating jet or flame.

It is an object of this invention to provide improved apparatus for such surface treatment of cylindrical articles whereby the treatment of a large series of articles can be performed automatically in a highly uniform manner. Another object is to provide such apparatus which will be suitable for the treatment of articles differing in size and/or shape without requiring time-consuming replacement of the supporting means therefore. Another object is to permit the treatment of articles of both cylindrical, i.e. rotationally symmetrical form, and articles of flat or oblong shape with only a simple and quick modification of the apparatus. Other objects will appear.

In the specification and claims, the term "cylindrical" will be used for brevity in a broad sense to designate surfaces of revolution, or surfaces having rotational symmetry, so that such term should be interpreted as including shapes other than cylindrical, e.g. conical, frusto-conical, and other surfaces of revolution, as well as prismatic, pyramidal and other polygonal shapes that may approximate surfaces of revolution.

A preferred embodiment of the invention will now be described for purposes of illustration but not of limitation with reference to the accompanying drawings, wherein:

FIG. 1 is a plan view of the improved apparatus for the surface treating of polyethylene bottles and the like;

FIG. 2 is a corresponding elevational view;

FIG. 3 is a detail sectional elevational view, on an enlarged scale, showing the rotatable mounting support for a bottle to be treated;

FIG. 4 is a similar partial view, on a somewhat smaller scale, of the rotable support with a bottle thereon; and FIG. 5 is a transverse view of the machine in section.

Figure 1:
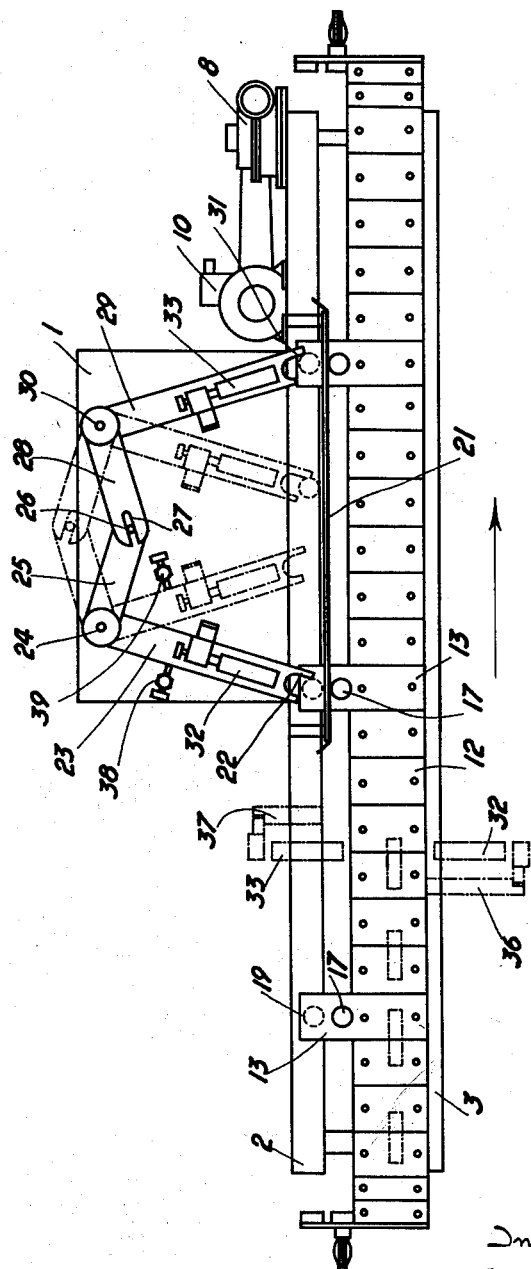

The machine as illustrated comprises a frame 1 including two longitudinal members or channels 2 and 3 between which an endless conveyor chain 5 is mounted by suitable means not shown in detail. The conveyor chain is trained at its ends around the two drums 6 and 7, drum 6 being driven in rotation from a motor 10 through a reducer 8. The conveyor may include any endless flexible means, such as a chain or pair of chains with interpivoted links 11, and carries all around its length a series of closely spaced rigid elements such as plates 12. Selected ones of said plates at spaced intervals along the chain are of increased length as indicated for the plates 13, and the extended sides of these plates project toward one side of the conveyor. The projecting portions of the plates 13 carry rotatable means for mounting the articles to be treated, such as bottles. The mounting means, as shown e.g. in FIG. 5, comprise an annular member 14 secured to the under side of plate 13 and having a shaft 15 rotatably supported therein in bearings 16. The shaft 15 projects through the plate 13 and is formed with a square driver portion above said plate on which is drivably fitted a rotatable, cylindrical hub or base member 17. The shaft 15 is extended above the hub member 17 and its extension is provided with four leaf springs 18 (see FIG. 3), which are cambered outwardly and project in four directions cross-wise around the shaft extension. As shown in FIGS. 4 and 5, the arrangement is such that a container such as a bottle can be fitted in inverted condition over the mounting means described and the leaf springs 18 will engage the inner surfaces of the container neck pressing it against the rotatable hub 17 and centering the container axially with respect thereto, so that on rotation of the hub 17 as further described the container will be rotated therewith. This mounting arrangement moreover will take up differences in size and shape of the containers within reasonable limits.

Rotatably supported from the under side of each plate 13, outwardly from the member 17, is a roller 19 journalled on a pivot pin 20.

A rail 21 is supported from the machine frame alongside the conveyor in a position to be engaged by the hub members 17 as they are fed past the rail on movement of the conveyor. The rail 21 and/or hub members 17 may be provided with suitable friction lining means if desired. The arrangement is such that frictional engagement of each hub member 17 with the rail will rotate the hub 17 and therewith shaft 15 and the container supported thereon throughout the displacement thereof past the rail.

Means are further provided according to the invention for directing a treating jet, such as a burner flame, against the revolving surface of each bottle as it moves past the rail 21. As shown, a pair of levers 23 and 29 have their one ends pivoted on vertical axes 24 and 30 on the machine frame 1, the pivot axes 24 and 30 being spaced with respect to each other along a direction parallel to the longitudinal motion of the conveyor and being displaced to one side therefrom. The arms 23 and 29 project towards the conveyor and support respective burners 32 and 33 removably mounted thereon and directed towards the conveyor. At its free end each lever arm is formed with a finger 22, 31 respectively, adapted for engagement with the rollers 19 as will appear more clearly from the ensuing description. Furthermore, each lever arm 23, 29 has an extension arm 25, 28 extending from its pivoted end towards the other lever, and the respective extension arms are provided at their ends with interengageable pin and slot means, 26 and 27 respectively.

In operation, as a plate 13 carrying a bottle on the rotatable supporting means thereof is advanced by the conveyor in the rightward direction shown by the arrow in FIG. 1, the member 17 and bottle is set in rotation by frictional engagement with the rail as earlier described. At the same time, as the plate 13 starts moving past the initial portion of the rail, the roller 19 engages finger 22 of lever arm 23 and rotates the lever counter-clockwise about its pivot 24, from the full line position to the chain-line position shown in FIG. 1, which positions are preferably positively determined by means of adjustable stops 38 and 39. Meanwhile the burner 32 carried by the lever arm has been activated to discharge a jet of high-temperature oxidizing gases or flame, and it will be apparent that owing to the arcuate displacement of the arm 23 by the driver roller 19 the jet from burner 32 will be directed square against the revolving surface of the container supported on plate 13 to subject said surface to a uniform flaming treatment. As lever arm 23 is rotated counter-clockwise, the pin 26 associated therewith rides in the slot 27 and rotates the other lever arm 29 clockwise to cause the latter to describe a similar, but reversely-directed arc from the full line position of said arm 29 to the chain-line position. Thus, on roller 19 of the plate 13 disengaging the first lever arm 23 in the chain-line position of said arm, the second arm 29 is suitably positioned for engagement by said roller; the roller 19 engages the finger 31 of arm 29 and rotates the said arm counter-clockwise from its chain-line position to its full-line position, during which movement the burner 33 directs its flame against the revolving surface of the part to be treated. At the same time the pin-and-slot connection 26—27 causes the first lever arm 23 to be rotated clockwise from the chain-line position to its full-line initial position, preparatory to being engaged by a driver roller 19 associated with the next article-supporting plate 13.

It will be apparent that the arrangement described ensures that a burner flame is directed squarely at the revolving surface to be treated throughout the movement of each article past the rail 21, even though the length of the rail is considerable, and it would not be feasible to obtain uniform treatment of each article over the full length of the rail by means of a single burner without mechanical complications. It should be understood that the construction described, wherein two burners are supported on respectve pivoted arms so interlinked that one burner is operative over an initial half of the active feed displacement of each article and the other burner takes over during the remaining part of said displacement, is a preferred construction but that the invention may be embodied in various ways.

As shown in FIG. 2, the treated articles are fed past the end drum 6 of the conveyor and on to the under-leaf of the conveyor, where they are retained in depending condition by the resilient engagement of the spring strips 18. At one point beneath the conveyor there is arranged ejector structure which may comprise a parallel spaced pair of inclined strips or ramps 34 (only one shown) which engage the outer surface of the container on opposite sides of its neck and thereby gradually force the container out of its resiliently engaged position, and allow it to drop on to suitable receiver means, such as a discharge conveyor not shown.

The illustrated preferred embodiment of the improved apparatus is so devised that it can easily be converted, when desired, for use in the flaming treatment of articles with flat or asymmetrical surfaces that do not require rotation of the article during flaming treatment. In such case, the articles, such as flat polyethylene phials for example, are simply positioned upon the plates 12 and 13 of the conveyor as indicated in chain lines at the left of FIG. 1, where they may be secured in position by any suitable means not shown. The burners 32 and 33 are removed from their supports on arms 23 and 29 and are mounted instead upon one or more fixed brackets such as 36 and 37 alongside the conveyor. As shown, there are two fixed burner brackets 36 and 37 positioned on opposite sides of the conveyor for treating the opposite flat surfaces of each article. However more than one pair of opposed burner supports may be provided. Preferably, the lever arms 23 and 29 are disengaged from each other and from the stops 38 and 39 and rotated to idle positions where they will not be engaged by the driver rollers 19.

It will be understood that various modifications may be made in the single exemplary embodiment illustrated and described without departing from the scope of the invention.

What I claim is:

1. In apparatus for flaming the surfaces of generally cylindrical articles, the combination comprising a conveyor; means on the conveyor for supporting said articles for rotation about axes spaced along the conveyor; a rail extending paralel to the conveyor and operatively engageable with said article supporting means to rotate each article as it is fed past the rail; a pair of levers pivoted for rotation about axes spaced longitudinally of the conveyor and displaced to one side therefrom, said levers extending towards the conveyor; a burner on each lever directed towards the conveyor; driver means on the conveyor adjacent each article drivingly engageable with the free end of first one then the other of said levers as the article is fed past the rail; and a mechanical connection means interconnecting the levers constraining the levers to describe simultaneous arcs of rotation in opposite sense whereby first one then the other of said burners will be directed towards the rotating surface of each article as the article is fed past the rail.

2. The combination claimed in claim 1, wherein said mechanical connection comprises a pair of lever extensions projecting towards each other and cooperating pin and slot means on said lever extensions.

3. In apparatus for treating the surfaces of generally cylindrical articles, the combination comprising an endless conveyor; means supporting the articles for rotation about axes spaced along the conveyor; a rail extending parallel to the conveyor and engageable with said article supporting means to rotate each article as it is fed past the rail; a pair of levers pivoted for arcuate movement about axes spaced longitudinally of the conveyor and displaced laterally therefrom, said levers extending towards the conveyor; means on each lever directed towards the conveyor for discharging a treating jet thereat; driver means on the conveyor adjacent each article drivingly engageable with the free ends of the levers to rotate same; linkage interconnecting the levers for correlated timed arcuate movement whereby each driver means will first rotate one lever as the adjacent article is fed past a first section of the rail and will then rotate the other lever as said article is fed past another section of the rail and whereby said article will have a treating jet directed at the rotating surface thereof throughout the feeding of said article past the rail.

4. In apparatus for treating the surfaces of generally cylindrical articles with treating jets, the combination comprising a frame; a conveyor displaceable past the frame; means supporting the articles for rotation about axes spaced along the conveyor; means operated by displacement of the conveyor for rotating each article as it is fed past a predetermined section of the frame; treating members supported for arcuate displacement adjacent said frame section and operable for discharging respective treating jets generally towards the conveyor; and means operated by displacement of the conveyor past said frame section for imparting arcuate displacements to said treating members in timed relation with the feed of the articles whereby first one treating member then another treating member will discharge its jet squarely at the article as the article is being fed past said section.

References Cited in the file of this patent

UNITED STATES PATENTS

| 2,365,259 | Fischer | Dec. 19, 1944 |
| 2,696,978 | Siegel | Dec. 14, 1954 |
| 2,784,531 | Hahn | Mar. 12, 1957 |
| 2,843,370 | Engel et al. | July 15, 1958 |
| 2,940,742 | Penca | June 14, 1960 |